Patented Aug. 27, 1963

3,102,033
FLAVORING COMPOSITION AND METHOD OF PREPARING THE SAME
Simon S. Jackel, Highland Park, Ill., assignor to Vico Products Company, Chicago, Ill., a corporation of Illinois
No Drawing. Filed Aug. 30, 1961, Ser. No. 134,861
8 Claims. (Cl. 99—90)

This invention relates to a flavoring composition. In one of its aspects this invention relates to a flavoring composition for imparting desirable yeast-like flavoring characteristics to chemically leavened baked products. In another of its aspects this invention relates to a flavoring composition for augmenting and balancing the flavor of yeast leavened baked products which have been subjected to shortened or modified fermentation procedures resulting in yeast-flavor deficiencies in such products.

The use of leavening agents in place of bakers' yeast in the baking of bread has heretofore been suggested and considerable work has been done to adapt the same commercially and in military baking operations for on the spot production of freshly baked bread. While numerous advantages attend the substitution of chemical leavening agents for bakers' yeast in the baking of bread and other commonly yeast leavened baked products, such as simplicity of operations, saving of time, and reduced cost of manufacturing equipment, certain serious disadvantages also result, notably in relation to the flavor characteristics of the baked bread or other baked products. For example, in the case of baked bread utilizing glucono-delta-lactone as the chemical leavening agent, which is perhaps the most widely suggested chemical leavening agent as a substitute for bakers' yeast, the finished freshly baked bread not only lacks the desirable flavor and aroma of freshly baked yeast leavened bread but, in addition, is usually characterized by an unpleasant sour, chalky, raw dough after-taste.

In an attempt to take advantage of the desirable features of using chemical leavening agents in place of bakers' yeast in the production of bread and other bakery products, and at the same time to overcome the undesirable features thereof, numerous efforts have been made to attempt to develop flavoring agents or compositions which, when incorporated into the dough batch, would result in a finished baked bread or other bakery product which would have the desirable flavor and aroma characteristics of yeast leavened bakery products. These attempts have involved a variety of approaches to the problem, illustrative of which have been the utilization of fermenting yeast suspensions, as disclosed, for example, in U.S. Patents Nos. 2,326,134 and 2,382,305, and the utilization of dry fermentation-produced flavor preparations as disclosed in U.S. Patent No. 2,969,289. In these, and in all other cases, so far as I am aware, the flavoring preparations have not proven to be adequate to meet the requirements and standards of those concerned with providing fully satisfactory chemicaly leavened bread.

Aside from the flavoring problems encountered with baked products wherein chemical leavening agents have been utilized, there exists a related problem in yeast leavened products which have been subjected to shortened or modified fermentation and leavening procedures. It is well known that the development of full flavor characteristics in yeast leavened baked products such as bread is primarily attributable to slow fermentation and leavening. However, due to increasing labor costs in commercial baking operations the periods required to accomplish this end have been substantially reduced with a consequent sacrifice in flavor. This loss in flavor has been masked, in part, by increasing the sugar levels normally used. This has the effect of substituting a sweet flavor for the natural bread flavor.

In those commercial baking operations employing continuous systems for producing bread, a similar flavor problem is created. In such operations the dough batch is conditioned by mechanical means with the result that fermentation and leavening times are reduced to a minimum. Efforts to overcome the flavor deficiencies of bread produced by continuous methods have involved the metered addition of a fermentation brew into the dough batch. This procedure has the important disadvantages, among others, of requiring constant production of the brew in special and separate equipment, together with the provision of means for conveying and introducing the brew into the dough batch, and still the desirable yeast-flavor of good quality yeast leavened bread is not adequately obtained. It should be apparent from this that it would be desirable to have a more effective, efficient and economical means for overcoming the flavor deficiencies of baked products produced in accordance with the methods outlined.

It is an object of this invention to provide an improved flavoring composition capable of imparting desirable yeast-like flavoring characteristics to chemically leavened bakery products. Another object of this invention is to provide a flavoring composition which when incorporated into a bake mix containing a chemical leavening agent will impart desirable yeast flavor characteristics to the end product and mask any unfavorable flavors and aromas that may result from the use of such a leavening agent. Still another object of this invention is to provide a flavoring composition which when incorporated into yeast leavened bakery products produced in accordance with procedures employing shortened or modified fermentation techniques will enhance and balance any flavor characteristics which have been diminished or lost as a result of such techniques. Another object of this invention is to provide a method for producing a dry, stable flavoring composition capable of imparting desirable flavor characteristics to chemically leavened bakery goods. These and other objects will be apparent from and are achieved in accordance with the following disclosure.

The flavoring compositions of the present invention are prepared from a fermentation brew of a particular character and produced under certain particular conditions, all as hereafter described in detail. The ingredients of the brew comprise bakers' yeast solids; a yeast-fermentable saccharide which may be a monosaccharide, particularly dextrose, or a disaccharide, particularly sucrose; lactose or a source thereof, especially non-fat milk solids; and water. I have discovered that by utilizing particular concentrations of the aforesaid ingredients and particular fermentation times, a flavoring composition can be produced which highly effectively achieves the objects of this invention.

I have discovered that the fermentation brew should contain from about 15% to about 25% of yeast solids, based on the total weight of the brew, especially satisfactory being active dry bakers' yeast. I have discovered further, that the fermentation brew should contain from about 4% to about 8%, by weight, of a yeast fermentable monosaccharide or disaccharide, particularly dextrose; and from about 4% to 6%, by weight, of non-fat milk solids or, although not so fully satisfactory, an amount of lactose or whey equivalent to that present in such proportions of non-fat milk solids. The yeast, dextrose and non-fat milk solids in the concentrations specified are added to water to complete the brew formulation. The water component of the brew constitutes from about 61% to about 77% of the total weight of the mixture.

It is particularly desirable, as indicated, to utilize non-fat milk solids as a source of lactose because, among other things, the non-fat milk solids serve to buffer the fermentation media and prevent it from becoming too acidic. Where lactose as such is used, or for that matter where whey or dried whey is utilized as a source of lactose, extraneous buffers should advantageously be added, calcium carbonate being particularly desirable. In addition, where non-fat milk solids are not utilized as the lactose source, it is advisable for fully satisfactory results to add to the fermentation medium small proportions of nutrient materials for the acting bacteria in the fermentation, such nutrient materials comprising various mineral salts, water-soluble vitamins and nitrogenous materials such as ammonium salts.

In the practice of this invention the brew prepared as above described is fermented at a temperature of from about 80° F. to about 100° F. especially at approximately 86° F., and for approximately 4 to 16 hours, especially for from 5 or 6 to 8 or 12 hours, under anaerobic conditions. Aseptic conditions are not essential in this operation.

I have discovered that the progress of the development of the desired flavoring and aromatic materials can be readily monitored by determining the titratable acidity of the brew as fermentation proceeds. The titratable acids produced may be measured as lactic acid by ascertaining the titratable acidity of the brew before and after fermentation and subtracting the former determination from the latter. Prior to fermentation this value is about 0.1. Shortly after fermentation begins this value approaches a range of about 0.9. As the fermentation of the brew proceeds the titratable acidity diminishes to a plateau value ranging from about 0.43 to about 0.58. It is at this point that optimum quantities of the sought after flavoring and aromatic materials are present in the brew. If fermentation is permitted to continue beyond about 16 hours, the value of the titratable acidity falls slowly to a value of about 0.37 and as it does there is a tendency to develop cheese-like off flavors. It is desirable, therefore, in at least most cases, not to carry the fermentation time beyond about 16 hours if the best results are to be obtained.

The progress of the fermentation may be halted by raising the temperature of the brew to approximately 150° F. and holding at that temperature for about 15 minutes. This inactivates the microorganisms without affecting the quality of the flavoring products formed during the fermentation. As an optional procedure, I have discovered that the fermentation brew, prior to inactivation of the microorganisms, may be subjected to a washing operation to remove any water soluble materials present. This may be performed without any loss in yeast flavor characteristics of the fermentation solids in the brew. The fermented brew, following inactivation, is subjected to a drying operation. This may be carried out in any conventional manner such as drum or spray drying and, for best results, the drying should be carried out under gentle conditions as, for example, drum drying at 30 p.s.i. steam pressure. Highly specialized methods of drying such as lyophilization may be employed but are generally not indicated because of economic considerations. The finished dried flavoring composition may then be suitably packaged.

As an illustrative embodiment of a manner in which flavoring compositions of the present invention may be produced, the following example is given:

Example 1

A fermentation brew was formed containing 20 parts bakers' yeast solids, 5 parts dextrose, 5 parts non-fat milk solids, and 80 parts water, said parts being by weight. Compressed bakers' yeast can be used in place of the bakers' yeast solids but allowance should be made for the water content thereof (66.7 parts of compressed bakers' yeast contain 20 parts yeast solids and 46.7 parts water). No adjustment of the pH was made. The brew was anerobolically fermented for 6 hours at 86° F. under clean but not sterile conditions. As completion the brew was heated at a temperature of 150° F. for 15 minutes to inactivate the microorganisms. The brew was then subjected to drum drying at 30 p.s.i. steam pressure. The resulting flavoring composition comprising the thus produced fermentation solids was then placed in an air tight container.

Stability tests conducted with the aforesaid flavoring composition produced in accordance with this invention showed no loss in flavor, or development of off-flavors, after two weeks in an air pack at 140° F., room temperature, or under refrigeration.

The following compositions of my invention may be incorporated into the dough batch of any bread composition or other bakery product to impart a desirable yeast flavor or aroma to the finished baked product. The following represents a typical example of the production of a bread utilizing the flavoring composition produced as described in Example 1.

Example 2

1,000 g. bread flour (hard red winter wheat), 100 g. salt, 60 g. dextrose, 60 g. non-fat milk, 74.5 g. finely ground glucono-delta-lactone, and 25 g. of the dry flavoring composition of Example 1 were blended together in a Hobart A-120 mixer with McDuffee bowl and fork. To the resulting blend, 610 cc. water were added and mixed for 3 minutes at 1st speed and then 7 minutes at 2nd speed. Then 35 g. soda and 50 g. lard, previously blended together, were added, mixed for 3 minutes at 2nd speed, scaled by hand, molded on a Century molder, and promptly panned. The dough was allowed to rest in the pans for 5 to 10 minutes, and then baked at 425° F. The flavor and aroma of the bread were excellent, resembling yeast-leavened bread.

The proportions of the flavoring compositions which can be employed in the bakery products are variable but in all cases will represent not more than a few percent based on the weight of the flour. In general, with formulations employing chemical leavening agents, the amount should not be appreciably less than 1% and ordinarily will not exceed 4 to 5% based on the weight of the flour, the usually preferred range being about 1.5 to 3%.

Various additional ingredients can be added to the flavoring compositions of my present invention for particular purposes. Thus, for instance, I have found it advantageous to admix inactive dry bakers' yeast with the dry flavoring compositions of my invention. Such a mixture, which may contain from 0.5 to 2 parts by weight of inactive dry bakers' yeast to 1 part of dry flavoring composition, has significant advantages in connection with the production, for example, of commercial white bread. By employing flavoring compositions made pursuant to my invention together with inactive dry bakers' yeast, I have been able to obtain commercial white bread of improved flavor and aroma approximating that of old fashioned home baked bread, while retaining the economic advantage of markedly reduced leavening periods. In such procedures, the inactive dry bakers' yeast can be used at a level of about 1 to 2% by weight of the flour together with the flavoring compositions of my invention in the proportions stated above.

It should also be noted, in this same general connection, that the utilization of flavor compositions made pursuant to my invention makes possible techniques not heretofore feasible in commercial bread baking operations. Thus, for example, bread flavoring compositions of my invention can be incorporated into a bread dough batch with conventional dough conditioning agents together with yeast as the leavening agent but, instead of using the usual two or three preliminary dough rises, said dough rises may be eliminated, the dough being placed directly into the baking pans after mixing, allowed to rise in the pans as conventional (pan proof), and baked directly. In such a situation, a somewhat higher level of yeast can be used to compensate for the increase in yeast activity during the preliminary rises, and the bread flavoring compositions of my invention serve to supply the flavor components produced in the preliminary rises. This technique, which makes possible large labor savings in commercial operations, also has utility in home baking with prepared mixes.

I have also found that the addition of the flavor compositions of my invention in conjunction with inactive dry bakers' yeast has still another advantage. Commercial white bread is generally characterized by a high level of sweetness which, in the case of chemically leavened bread, is unpleasant. When the flavor compositions of my invention and inactive dry bakers' yeast are incorporated into the dough for making such chemically leavened bread, the flavor of the resulting bread is so changed that the addition of sugar to increase the sweetness level is not only not objectionable but, in fact, serves to bring the bread flavor even closer to that of yeast leavened bread.

In commercial operations employing continuous bread making equipment, the use of my flavoring compositions provides a particularly effective and economical means for improving the desired yeast flavor and aroma characteristics of bread prepared with such equipment. As pointed out earlier, the mechanical conditioning of the dough batch in continuous bread making operations substantially reduces the leavening period, resulting in incomplete development of the desired yeast flavor and aroma. In an effort to attempt to compensate for this deficiency in flavor and aroma the industry has found it necessary to prepare a fermentation brew in separate facilities and introduce the aqueous brew into the dough batch at some point in the continuous system. Aside from its obvious economic disadvantages, this method is cumbersome and does not necessarily assure uniform results. I have found that the addition of my dry flavoring composition to the dough batch in a continuous bread baking operation eliminates the need for expensive auxiliary fermentation brew equipment and enables the production of bread having uniformly desirable yeast flavor and aroma characteristics. In such operations my flavoring composition is added at levels of from ¼% to ½%, and preferably ⅜%, by weight, based on the weight of the flour, and may be introduced into the dough batch at any suitable point in the continuous system.

It may also be observed that the addition of the flavoring compositions of my invention to the dough batches has the further advantage of masking the unpleasant flavor not infrequently imparted to bakery goods by such ingredients as anti-mold agents, exemplified by sodium and calcium propionates, which are conventionally used in bakery products.

While flavoring compositions made pursuant to my invention are especially important for use in the baking of bread, they also have a marked utility in the production of other bakery products such as rolls, buns, biscuits, and prepared mixes or compositions for home baking of such bakery goods as hot rolls, pizza shells, coffee cake and doughnuts. Prepared bakery mixes or compositions, which are conventionally marketed in dry form, contain flour and other ingredients such as sugar, salt, dried eggs, shortening, etc., as well as, of course, the chemical leavening agent or agents. These known types of mixes may have added thereto appropriate amounts of dry flavoring compositions made pursuant to my invention to impart thereto the pleasant flavor and aroma of yeast-leavened bakery products.

It should be apparent from the foregoing description that my invention has important uses in both military and civilian bakery operations. It provides an efficient and highly effective means for producing in bakery goods the desirable flavoring and aromatic properties, characteristic of yeast-leavened baked goods, which are lost in operations where speed and mass production are paramount.

Although I have illustrated and described my invention in its preferred aspects, it will be apparent that various changes may be made without departing from the spirit of the invention.

What I claim as new and desire to protect by Letters Patent is:

1. A method of preparing a dry, stable flavoring material useful for imparting desirable flavoring and aromatic characteristics to chemically leavened bakery products and to yeast leavened bakery products which have been subjected to shortened or modified fermentation procedures, comprising fermenting an aqueous nutrient medium containing, by weight, from 15% to 25% active bakers' yeast solids, from 4% to 8% of a yeast-fermentable saccharide, and a source of lactose sufficient in amount to provide an amount of lactose in the medium substantially equivalent to that which would be contained in from about 4% to about 6%, by weight, of non-fat milk solids, said fermentation being carried out at a temperature of from 80° F. to 100° F. for from 4 to 16 hours, inactivating the microorganisms in the medium to halt fermentation of the mass, and drying the inactivated fermented mass to obtain a dry flavoring material which is stable for a prolonged period over a wide range of temperatures when packaged in an air-tight container.

2. A method of preparing a dry, stable flavoring material useful for imparting desirable flavoring and aromatic characteristics to chemically leavened bakery products and to yeast leavened bakery products which have been subjected to shortened or modified fermentation procedures, comprising fermenting an aqueous nutrient medium containing, by weight, from 15% to 25% active bakers' yeast solids, from 4% to 8% dextrose, and from 4% to 6% non-fat milk solids, said fermentation being carried out until a titratable acidity value of from 0.43 to 0.58 is reached, inactivating the microorganisms in the medium to halt fermentation of the mass, and drying the inactivated fermented mass to obtain a dry flavoring material which is stable for a prolonged period over a wide range of temperatures when packaged in an air-tight container.

3. A method of preparing a dry, stable flavoring material useful for imparting desirable flavoring and aromatic characteristics to chemically leavened bakery products and to yeast leavened bakery products which have been subjected to shortened or modified fermentation procedures, comprising fermenting a nutrient medium containing approximately, by weight, 20 parts active bakers' yeast solids, 5 parts dextrose, 5 parts non-fat milk solids, and 80 parts water, said fermentation being carried out at a temperature of about 86° F. for from 5 to 12 hours, heating the fermented mass to a temperature of about 150° C. for about 15 minutes to inactivate the microorganisms in the medium to halt fermentation of the mass, and drying the inactivated fermented mass to obtain a dry flavoring material which is stable for a prolonged period over a wide range of temperatures when packaged in an air-tight container.

4. A method of preparing a dry, stable flavoring material useful for imparting desirable flavoring and aromatic characteristics to chemically leavened bakery products and to yeast leavened bakery products which have been subjected to shortened or modified fermentation procedures, comprising fermenting an aqueous nutrient medium containing, by weight, from 15% to 25% active bakers' yeast solids, from 4% to 8% of a yeast-fermentable saccharide, and a source of lactose sufficient in amount to provide an amount of lactose in the medium substantially equivalent to that which would be contained in from about 4% to about 6%, by weight, of non-fat milk solids, said fermentation being carried out at a temperature of from 80° F. to 100° F. for from 4 to 16 hours, washing the said medium to remove water solubles, inactivating the microorganisms to halt fermentation of the mass, and drying the inactivated fermented mass to obtain a dry flavoring material which is stable for a prolonged period over a wide range of temperatures when packaged in an air-tight container.

5. A method of imparting desirable yeast flavor characteristics to chemically leavened baked goods and masking undesirable flavors which comprises incorporating into the dough batch, prior to baking, a dry flavoring ingredient in the form of a fermentation reaction product of an aqueous medium containing, by weight, approximately 15% to 25% active bakers' yeast solids, 4% to 8% of a yeast fermentable saccharide, and a source of lactose sufficient in amount to provide an amount of lactose in the medium substantially equivalent to that which would be contained in from about 4% to about 6%, by weight, of non-fat milk solids, wherein the fermentation was carried out for a period between 4 to 16 hours after which the microorganisms in the medium were inactivated to halt fermentation and the inactivated fermented mass was dried.

6. A method of imparting desirable yeast flavor characteristics to chemically leavened bread in which the chemical leavening agent is glucono-delta-lactone and in masking undesirable flavors and tastes which normally result in such leavened bread, which comprises incorporating into the dough batch, prior to baking, a dry flavoring ingredient in the form of a fermentation reaction product of an aqueous medium containing, by weight, 15% to 25% active bakers' yeast solids, 4% to 8% dextrose, and 4% to 6% non-fat milk solids, wherein the fermentation was carried out for a period between 4 and 16 hours after which the microorganisms in the medium were inactivated to halt fermentation and the inactivated fermented mass was dried.

7. A method for augmenting and balancing the yeast flavor characteristics of leavened baked goods which comprises incorporating into the dough batch, prior to baking, from ¼% to ½%, by weight, based on the weight of the flour in the dough batch, a dry flavoring ingredient in the form of a fermentation reaction product of an aqueous medium containing, by weight, approximately 15% to 25% active bakers' yeast solids, 4% to 8% of a yeast fermentable saccharide, and a source of lactose sufficient in amount to provide an amount of lactose in the medium substantially equivalent to that which would be contained in from about 4% to about 6%, by weight, of non-fat milk solids, wherein the fermentation was carried out for a period between 4 to 16 hours after which the microorganisms in the medium were inactivated to halt fermentation and the inactivated fermented mass was dried.

8. A dry, stable flavoring composition useful for imparting desirable flavoring and aromatic characteristics to chemically leavened bakery products and to yeast leavened bakery products which have been subjected to shortened or modified fermentation procedures, comprising the fermentation reaction product of an aqueous medium containing, by weight, approximately 15% to 25% active bakers' yeast solids, 4% to 8% of a yeast fermentable saccharide, and a source of lactose sufficient in amount to provide an amount of lactose in the medium substantially equivalent to that which would be contained in from about 4% to 6%, by weight, of non-fat milk solids, wherein the fermentation was carried out for a period between 4 and 16 hours after which the microorganisms in the medium were inactivated to halt fermentation and the inactivated fermented mass was dried, the dried material thus obtained being stable for a prolonged period over a wide range of temperatures when packaged in an air-tight container.

References Cited in the file of this patent

UNITED STATES PATENTS 2,969,289　Matz et al. _____ Jan. 24, 1961

FOREIGN PATENTS 532,980　Canada _____ Nov. 13, 1956
821,318　Great Britain _____ Oct. 7, 1959

OTHER REFERENCES

"Cereal Chemistry," January 1959, pp. 1–3.